Oct. 22, 1929.　　　　　F. W. PLANT　　　　　1,733,029
FOLDING TABLE, DINNER OR TEA WAGON, AND THE LIKE
Filed Jan. 12, 1929　　　3 Sheets-Sheet 1
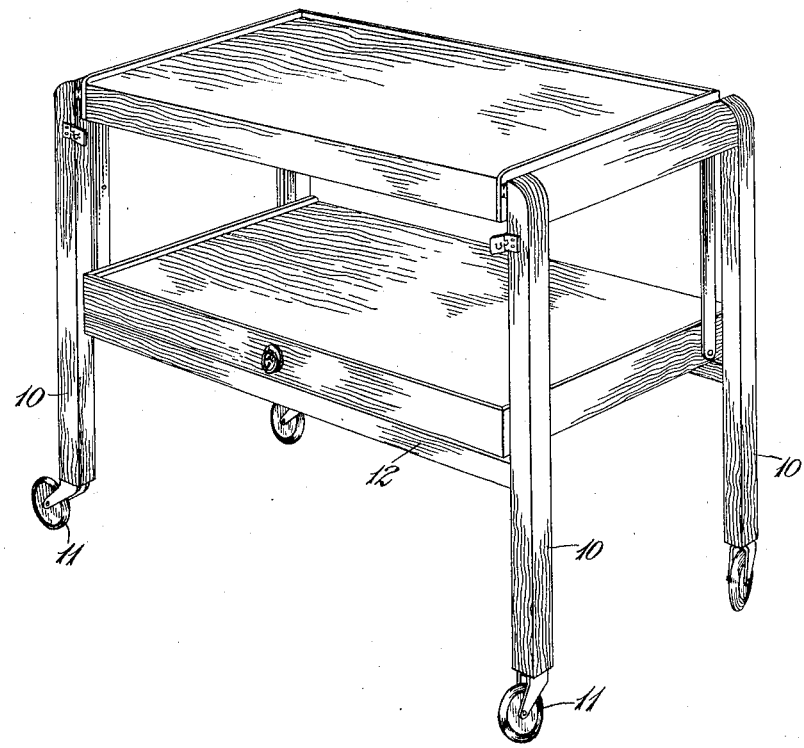
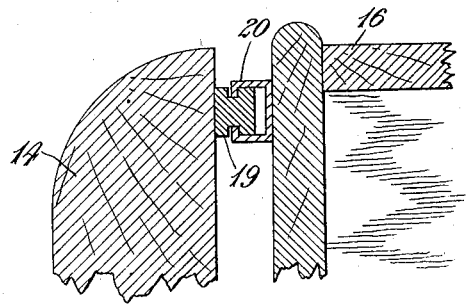
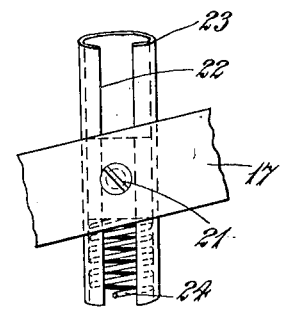

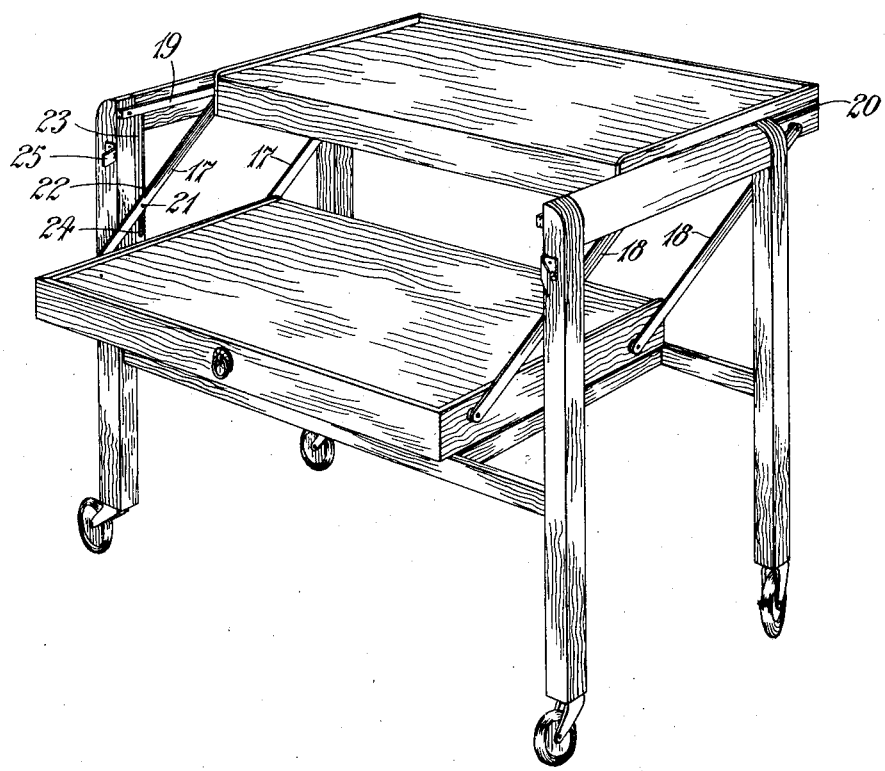

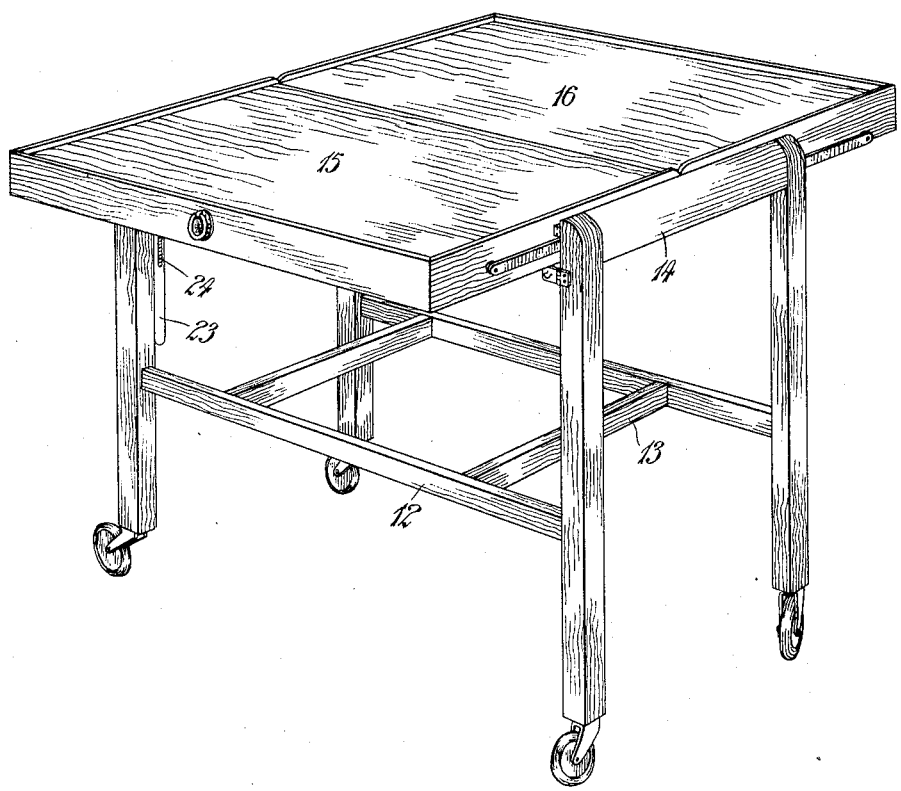

Patented Oct. 22, 1929

1,733,029

UNITED STATES PATENT OFFICE

FRANK WRIGHT PLANT, OF LONDON, ENGLAND

FOLDING TABLE, DINNER OR TEA WAGON, AND THE LIKE

Application filed January 12, 1929, Serial No. 331,976, and in Great Britain January 10, 1928.

This invention refers to improvements in or relating to folding tables, dinner or tea wagons and the like.

The invention has more particular reference to portable apparatus of the type in which two leaves are connected to one another and are mounted on a supporting stand by means of parallel links in such a manner that the leaves may be positioned vertically one above the other when the device is to serve as a dinner or tea wagon or in a common horizontal plane to constitute a flat table top, means being provided to lock the parts in said positions.

The primary object of the present invention is to provide convertible apparatus of the above kind of improved and simplified construction.

By the present invention the two leaves are so arranged that the one or upper leaf slides outwardly in a horizontal plane in relation to the supporting stand, whilst the other or lower leaf swings up from its lowermost position into a position alongside same or vice versa. To this end the two leaves are connected to the parallel links as heretofore, but the pivots or fulcrums of the links instead of being fixed in relation to the supporting stand or frame are guided up and down as by pins thereon engaging in slots in the legs thereof. Thus as the upper leaf can only move out laterally or in a horizontal plane in relation to the said frame, movement of the parts will cause the lower leaf to be swung up into the table position or into the same plane as the top leaf.

Now according to the present invention there is provided apparatus of the type described comprising a rigid supporting stand and an adjustable parallel-motion leaf mechanism mounted thereon, characterized in that one leaf always remains at a constant height in relation to the stand.

In order that the present invention may be clearly understood and more readily carried into effect, it is hereinafter described with reference to the accompanying drawings, in which:—

Figure 1 is a perspective view of the improved device according to the present invention, the two leaves being positioned vertically one above the other for use as a dinner or tea wagon:

Figure 2 is a similar view showing the parts in a half-way position as during manipulation.

Figure 3 shows the device with the two leaves in a common horizontal plane for use as a table:

Figure 4 is a detail view showing the interengaging parts of the frame and sliding leaf hereinafter referred to, and Figure 5 is a detail view of one of the links and its pivot or fulcrum and slide.

As shown and in carrying the present invention into effect, the supporting stand or frame may comprise an open rectangular framework having four legs 10 mounted on castors 11 and which is braced together by longitudinal and transverse bottom rails 12 and 13 respectively and also by transverse top rails 14 so as to accommodate between the upstanding end frames the two aforesaid leaves 15, 16 and the parallel motion linkage 17, 17 and 18, 18 connecting same. The upper leaf 16 which always maintains a constant level in relation to the supporting stand, is mounted to slide horizontally in relation thereto and to this end suitable runners 19 may be provided such for instance as by arranging lengths of rail section metal on the inside faces of the transverse top rails 14 of the upstanding end frames and suitable interengaging members or flanged channels 20 on the ends of the upper sliding leaf 16. The interengaging parts 19, 20 are, as shown in Figure 4, so formed as to prevent endwise disengagement of the parts, thus keeping the whole structure rigid though permitting of the necessary sliding movement of the leaf 16 in relation to the frame.

In one position the sliding leaf 16 occupies a position which, as shown in Figures 1, coincides with the top or plan dimensions of the frame and the other leaf 15 lies vertically below same whilst in the other or table position, shown in Figure 3, the sliding leaf 16 half overhangs the frame on one side and the swinging leaf 15 also half overhangs the frame on the other side.

The fulcrums or pivots 21 on the front or upper pair of links 17 and 18, which are preferably arranged just above the mid-points of the links, so as to facilitate operation and avoid sticking of the mechanism, may comprise studs or rollers which run in slots 22 provided in the legs 10 of the frame, or, as shown, in separate fittings 23 provided on or in connection therewith. In some cases springs 24 may be arranged to counterbalance the lower leaf 15 and mechanism and to render the manipulation of the device easier, and such springs 24 may, as shown, conveniently be disposed in or arranged in connection with the fittings 23 in which the pivots 21 of the links 17 and 18 slide. Any suitable form of locking devices, such as the hinged plates 25, may be provided to keep the parts in their respective positions and such devices may be conveniently controlled by springs or they may be toggle-actuated.

From the foregoing description it will be manifest that it is possible to provide a device of extremely attractive appearance, inasmuch as the links 17 and 18 do not show or extend above the level of the supporting stand 10, 11, 12, 13 and 14 when used as a dinner or tea wagon as has been the case in all previously known convertible apparatus of this type. In other words, the present invention is characterized in that when it is used as a dinner or tea wagon the top leaf 16 substantially coincides with the upper edge of the upstanding end members 14 of the framework, the links 17 and 18 are almost entirely hidden from view by the legs 10 and the whole device is practically indistinguishable from a rigid structure.

What I claim is:—

1. A combined tea wagon and table, including a stand, two leaves carried by the stand arranged in substantially superimposed relation in tea wagon form with each accessible for the reception and support of articles, the uppermost leaf being slidable in the stand in a fixed horizontal plane, and spaced members terminally connected to the respective leaves and serving in the horizontal movement of the uppermost leaf to swing the lowermost leaf toward and into the plane of the uppermost leaf to provide a table.

2. A combined tea wagon and table including a stand, an uppermost leaf sliding in a fixed horizontal plane in said stand, a lowermost leaf, and spaced members terminally connected to the respective leaves, with certain of the members having a pivotal connection with the stand, said members serving in the sliding movement of the uppermost leaf in one direction, to move the lowermost leaf into a plane with the uppermost leaf to provide a table and in the sliding movement of the uppermost leaf in the opposite direction moving the lowermost leaf into a plane below and in substantially vertical alignment with the uppermost leaf to provide a tea wagon, both leaves in either position being freely accessible for the support of articles.

3. A combined tea wagon and table including a stand, an uppermost leaf sliding in a fixed horizontal plane in said stand, a lowermost leaf, and spaced members terminally connected to the respective leaves, with certain of the members having a pivotal and sliding connection with the stand, said members serving in the sliding movement of the uppermost leaf in one direction, to move the lowermost leaf into a plane with the uppermost leaf to provide a table and in the sliding movement of the uppermost leaf in the opposite direction moving the lowermost leaf into a plane below and in substantially vertical alignment with the uppermost leaf to provide a tea wagon, both leaves in either position being freely accessible for the support of articles.

4. A combined tea wagon and table, including a stand, spaced horizontally arranged guides carried by the stand, a first leaf slidably cooperating with the guides, a second leaf, and spaced parallel links directly connecting the sliding leaf with such second leaf, certain of the links having a pivotal sliding connection with the stand, movement of the links compelling a sliding movement of the first leaf and a swinging movement of the second leaf, such link movement in one direction causing the leaves to be arranged in the same horizontal plane to form a table and in the opposite direction causing the leaves to be arranged in superimposed substantially vertical alignment to provide a tea wagon, the leaves in either position being freely accessible for the support of articles.

5. A combined tea wagon and table, including a stand, spaced horizontally arranged guides carried by the stand, a first leaf slidably cooperating with the guides, a second leaf, spaced parallel links terminally connected directly with the respective leaves, members slidable in the stand and providing pivotal supports for certain of the links, and means for normally influencing said members in the upward direction.

6. A combined tea wagon and table, including a stand, spaced horizontally arranged guides carried by the stand, a first leaf slidably cooperating with the guides, a second leaf, spaced parallel links terminally connected directly with the respective leaves, members slidable in the stand and providing pivotal supports for certain of the links, and springs underlying said members and normally exerting an upward pressure thereon.

In testimony whereof I have hereunto signed my name.

F. W. PLANT.